Fig. 8

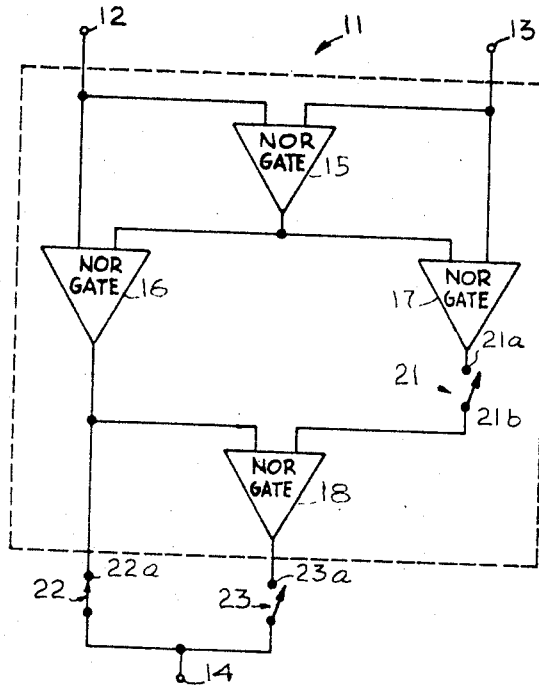
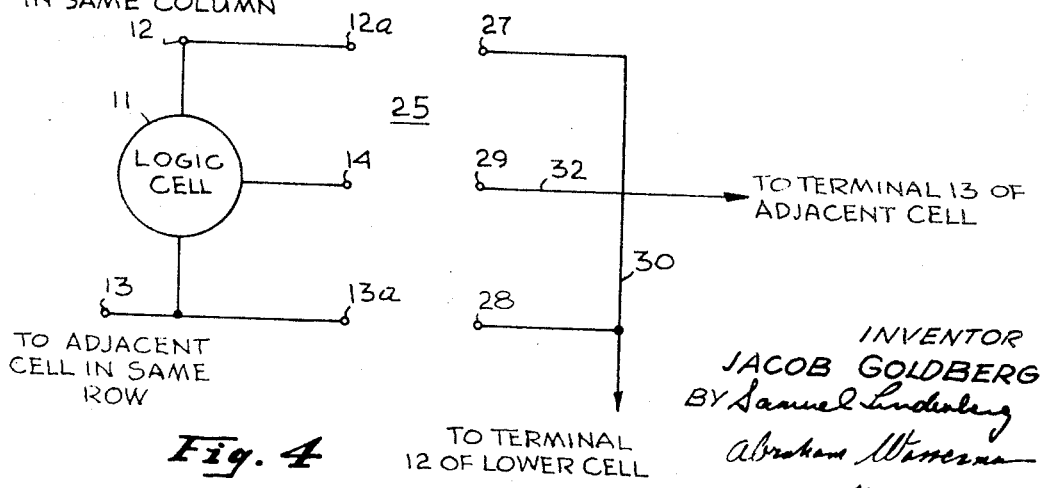

United States Patent Office 3,446,990
Patented May 27, 1969

3,446,990
CONTROLLABLE LOGIC CIRCUITS EMPLOYING FUNCTIONALLY IDENTICAL GATES
Jacob Goldberg, Palo Alto, Calif., assignor to Stanford Research Institute, Menlo Park, Calif., a corporation of California
Filed Dec. 10, 1965, Ser. No. 513,005
Int. Cl. H03k 19/34
U.S. Cl. 307—215                    10 Claims

ABSTRACT OF THE DISCLOSURE

Cells for use in a cellular logic array are disclosed. One cell includes four two-input NOR gates, interconnected to provide a binary output which is a function of two inputs to the cell and the controlled connection between two of the gates. In another cell, four NOR gates are interconnected to response to enabling and disabling signals to provide any one of up to seven different outputs, which are a function of at least one input signal and the disabling and enabling signals supplied thereto. The input and output terminals of each cell are arranged in two parallel coplanar lines to form a patch panel.

---

This invention relates to computer logic and storage devices and, more particularly, to improvements therein.

Many devices, such as binary digital computers employ large numbers of interconnected logic and storage cells. The design and construction of a large interconnected arrangement of cells is generally facilitated by grouping the cells in individual arrays of intermediate complexity. The use or arrays of intermediate complexity is especially desirable where microelectronic or integrated circuit techniques are employed, since many cells may easily be manufactured as a unit. In addition, when employing microelectronic techniques, it is desirable that the construction of each cell be as simple as possible and consists of elements which are easily constructable by such techniques. Another objective in designing logic and storage cells for use in computers is that each cell be selectively operable to perform any one of a plurality of functions thereby reducing the overall number of cells and arrays required in any computer.

Accordingly, it is an object of the present invention to provide a novel cell structure for performing logic functions of binary digits.

Another object is to provide a new cell for performing logic functions and/or storing binary digits therein.

A further object is the provision of a relatively simple cell which is selectively operable to perform any of a selected group of logic functions.

Still another object is to provide a new logic cell which may be grouped in an array, with the logic operation of each cell being alterable so as to cause the array to produce any one of a large number of logic functions.

Yet a further object is to provide a logic cell comprising of similar elements which can be constructed with known integrated circuit techniques, the cell being selectively energizable to perform any one of a plurality of functions.

These and other objects are achieved by providing a cell which is constructed of substantially similar logic-performing elements, the elements being interconnected so that by controlling the input signals supplied to a plurality of inputs of the cell, the cell provides two output signals which represent two predetermined functions of at least one of the inputs. In one embodiment of the invention in which the cell is energized by only two input signals, all but one of the connections between the various logic-performing elements are permanent wirings. In another embodiment, the interconnections within the cell are permanent but the number of input signals is increased, to five, with each of the output signals being one of a plurality of functions of at least one of the input signals.

Each cell includes means for selectively supplying various ones of the input signals to different inputs so that the desired function is produced therein. By forming an array in which at least one of the output signals of each cell is supplied to at least one other cell in the array, one of the output signals of one of the cells may be made a function of the particular mode of operation of a plurality of the cells in the array.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of one embodiment of a cell of the present invention;

FIGURES 2 and 3 are charts useful in explaining the operation of the cell shown in FIGURE 1;

FIGURE 4 is a schematic diagram of one embodiment of a multiterminal panel for use in conjunction with the cells of the present invention;

Figure 5:
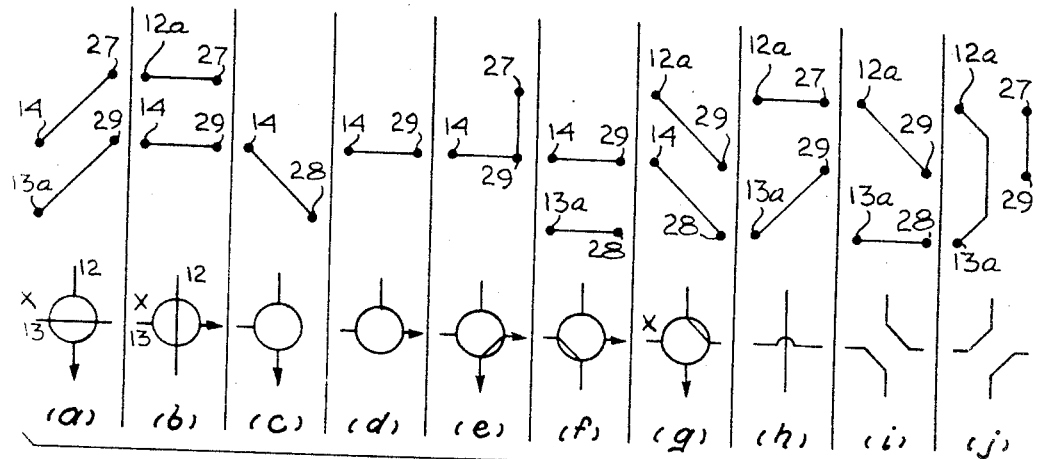
Figure 6:
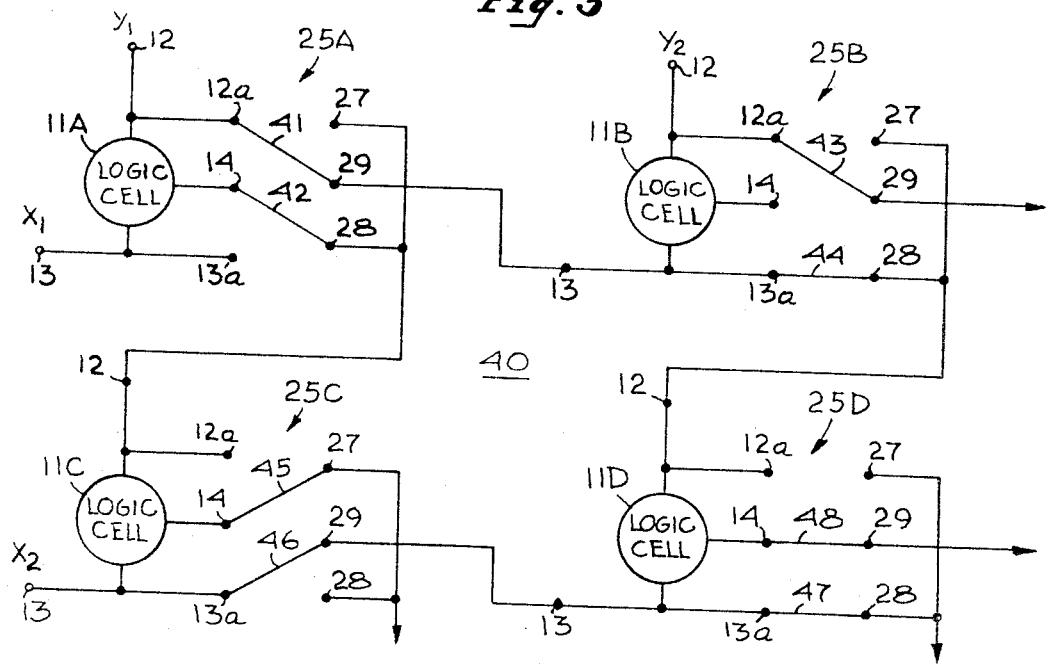
Figure 7:
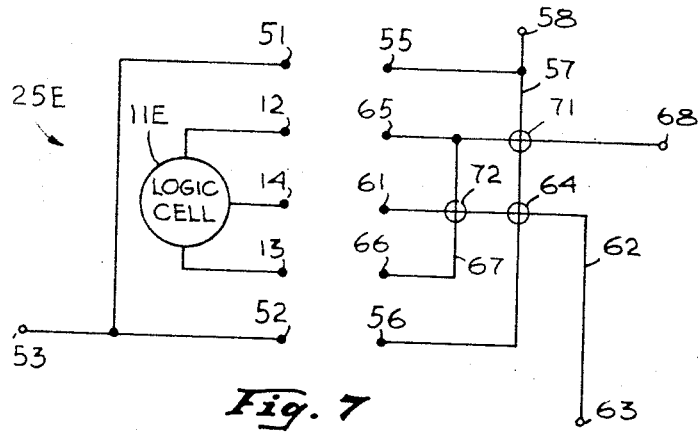
Figure 9:
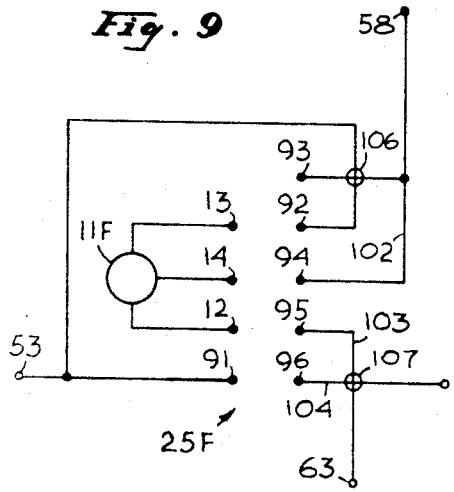
Figure 10:
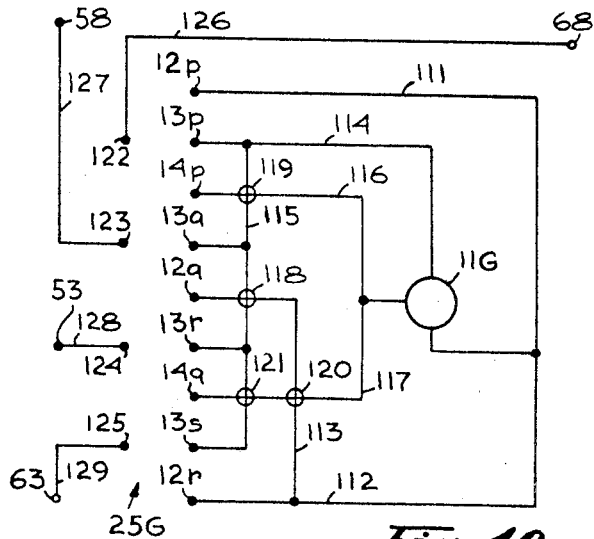
Figure 11:
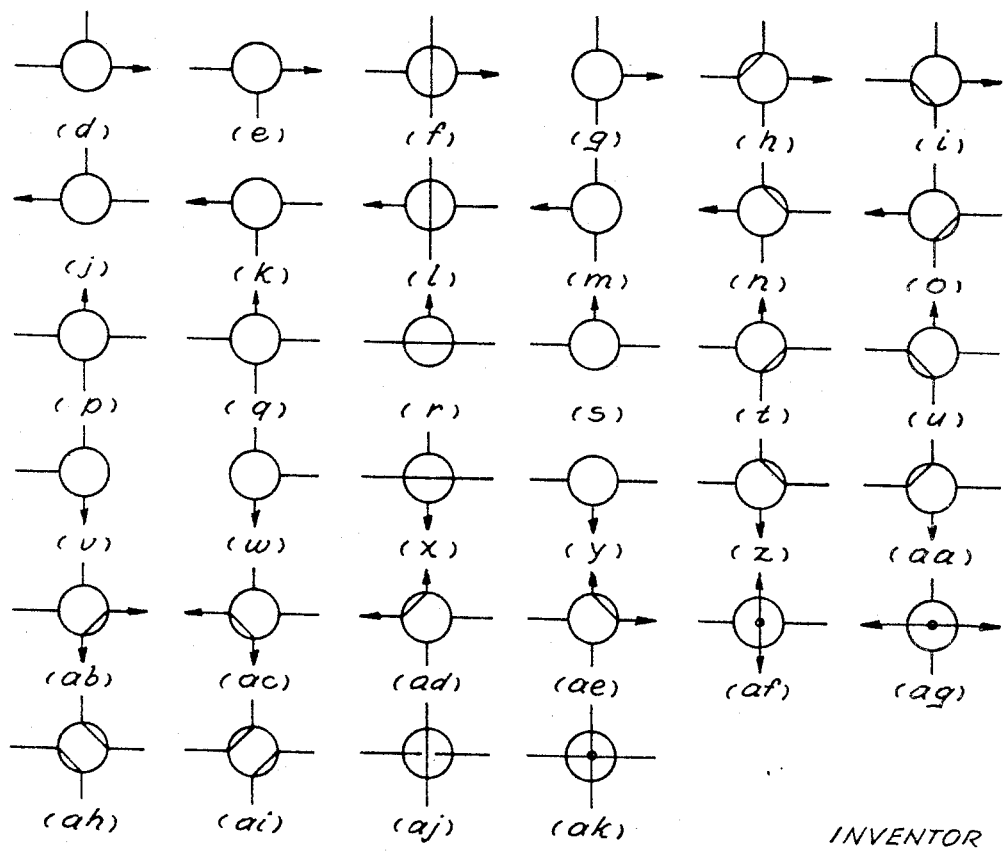
Figures 12, 13:
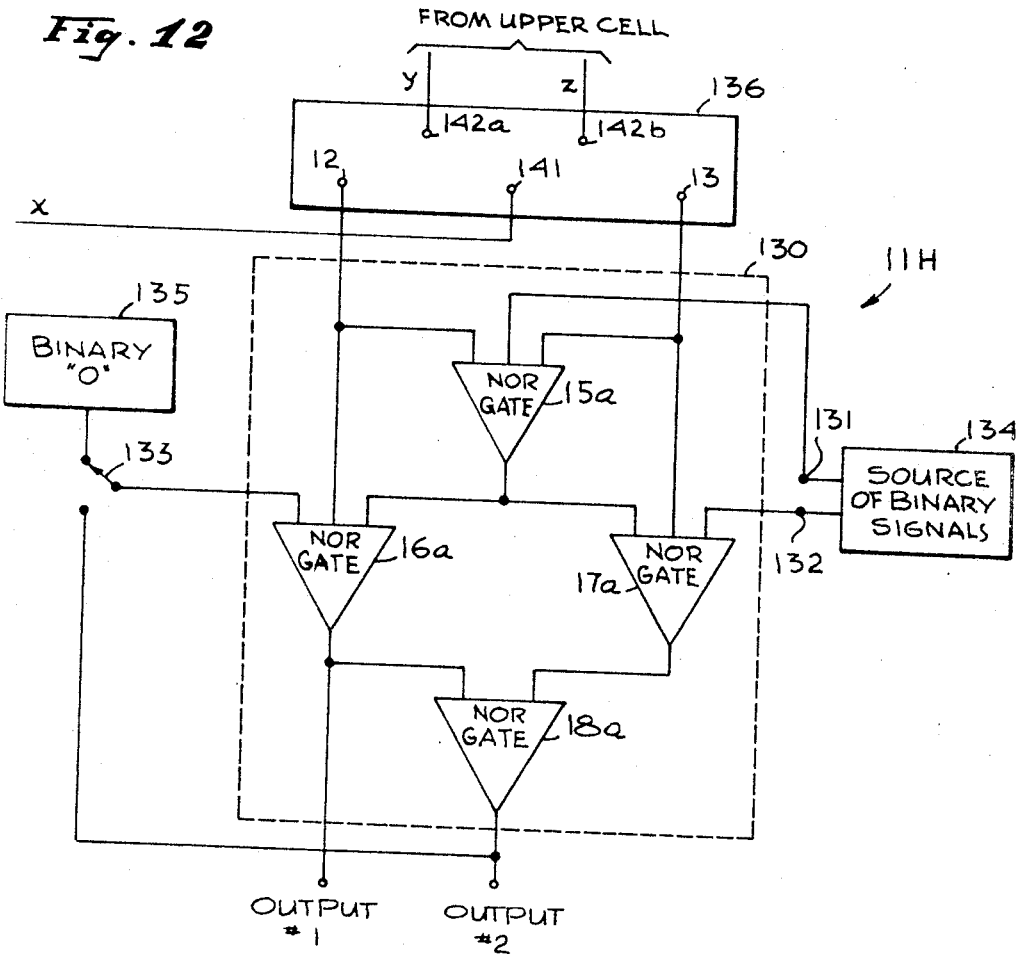

FIGURES 5(a) through 5(j) are diagrams useful in highlighting the usefulness and flexibility of the multiterminal panel of FIGURE 4;

FIGURE 6 is a diagram of a four cell array;

FIGURE 7 is a schematic diagram of another embodiment of a multiterminal panel;

Figure 8:
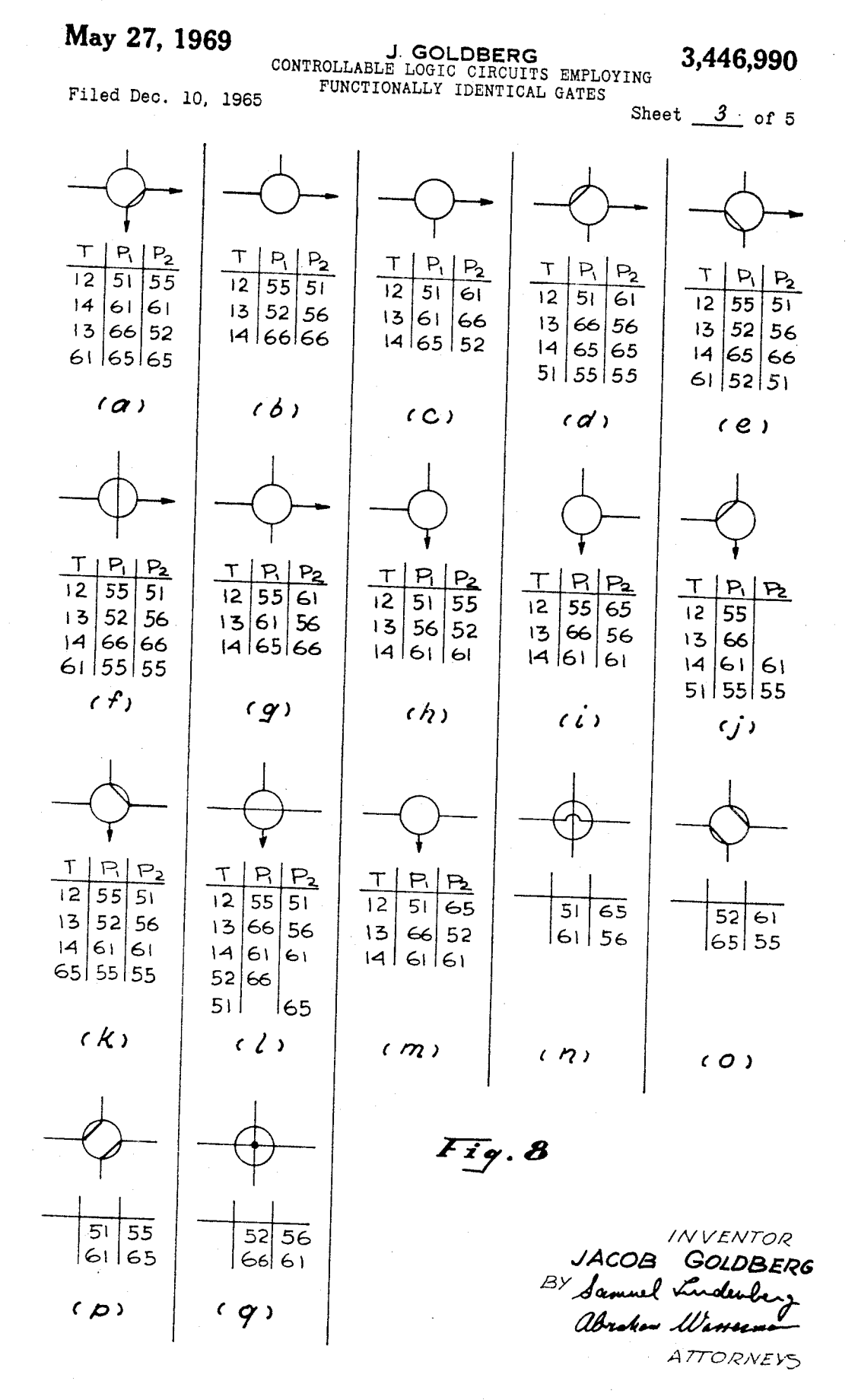

FIGURES 8(a) through 8(q) are diagrams useful in highlighting the usefulness of the multiterminal panel of FIGURE 7;

FIGURES 9 and 10 are schematic diagrams of two other embodiments of multiterminal panels;

FIGURES 11(d) through 11(z) and 11(aa) through 11(ak) are diagrams useful in highlighting the usefulness of the panel of FIGURE 10;

FIGURE 12 is a schematic diagram of another embodiment of a cell of the present invention; and FIGURE 13 is a chart in which the various functional outputs of the cell of FIGURE 12 are diagrammed with respect to vairous connections of the cell.

Reference is now made to FIGURE 1 which is a block diagram of one embodiment of the present invention. Therein is shown a cell 11 having two input terminals or inputs 12 and 13 and an output terminal or output 14. Input 12 is connected to one input of each of NOR gates 15 and 16. Similarly, input 13 is connected to one input of a NOR gate 17 and to the other input of gate 15. The output of NOR gate 15 is connected as one input to each of gates 16 and 17, while the output of gate 16 is directly connected to one input of a gate 18 and the output of gate 17 is connected to the same gates through a switch. The outputs of gates 16 and 18 are connected to the output 14 of the cell 11 through switches 22 and 23, respectively. Switches 22 and 23 are complementary in the sense that when switch 22 is closed, switch 23 is open as shown in FIGURE 1. Switch 21 on the other hand is independent, namely, it could be either in the open position as shown or in a closed position so that the output of gate 17 is supplied as one input of gate 18.

Let us assume that the input signals at inputs 12 and 13 are $a$ and $b$ respectively, each being either a binary "1" or a binary "0." Then the binary output signals of the various gates as a function of the input signals $a$ and $b$ are as shown in FIGURE 2 which may be thought of as a truth chart or table of the cell 11. From FIGURE 2 it is seen that the output of gate 16 is a binary "1" only when the $a$ input signal is a binary "0" and the $b$ input signal is a binary "1." Thus the output signal can be expressed as $\bar{a} \cdot b$, which represents the "and" function of the $b$ signal and the complement of the $a$ signal. When switch 22 is closed, this signal is applied through terminal 22a to the output terminal 14 of the cell 11. On the other hand, the output signal of gate 18 at a fixed terminal 23a is a function of the input signals $a$ and $b$ as well as the position of switch 21. When switch 21 is open, the signal at terminal 23a is as shown in the sixth column of FIGURE 2. Namely, the signal is a binary "1" except when $a$ is a binary "0" and $b$ is a binary "1." Thus it can be expressed as $a + \bar{b}$, the + sign indicating the Or function. However when switch 21 is closed, the signal at 23a is a binary "1" only when $a$ and $b$ are the same, so that it can be expressed as $$a \oplus \bar{b} = \overline{a \oplus b},$$

where the symbol $\oplus$ represents the Exclusive-Or function.

The functional outputs of cell 11 at terminal 14 are diagrammed in chart form in FIGURE 3 as a function of the positions of the switches 21, 22 and 23. As seen therefrom, any one of the three outputs may be provided as a function of the input signals $a$ and $b$, depending on the positions of the various switches. As previously stated, the functions $\bar{a}b$, $a+\bar{b}$ and $\overline{a \oplus b}$ represent an And function of the complement of the $a$ signal supplied via terminal 12 and the $b$ signal supplied via terminal 13, $a + \bar{b}$ indicates the Or function of the $a$ signal and the complement of the $b$ signal, while the last function indicates the Exclusive-Or function of the same signals. It is appreciated that if the $a$ and $b$ signals are supplied to terminals 13 and 12 respectively, the output signals of cell 11 may be defined as $a\bar{b}$, $\bar{a}+b$ and $\overline{a \oplus b}$. When cell 11 is part of an array of cells arranged in columns and rows, the $a$ input signal may be supplied for example from an adjacent cell to the left in the same row, while the $b$ input signal may be provided from the output of a cell above cell 11 in the same column. In addition, the output terminal 14 may be connected to a lower cell to provide it with one of its input signals.

The flexibility with which each cell is interconnected in the array may greatly be enhanced by associating each cell with a switching stage or patch panel to selectively route the output of each cell to an adjacent cell in the same row or column. For a better understanding of the advantages gained by such a patch panel, reference is made to FIGURE 4 wherein the circle 11 represents the cell 11 of FIGURE 1 including all the four NOR gates 15 through 18 and the three switches 21, 22 and 23. As seen, input terminals 12 and 13 which are assumed connected to the output of an upper cell in the same column of an array and to a lefthand cell in the same row of the array respectively are also connected to terminals 12a and 13a of a patch panel 25. The output terminal 14 of cell 11 also forms a part of panel 25. The panel 25 also includes a pair of terminals 27 and 28 which by means of line 30 are connected to an input terminal such as terminal 12 of a lower cell in the same column. A terminal 29 of the panel 25 is connected by means of a line 32 to the input terminal 13 of an adjacent cell on the righthand side on the same row.

From FIGURE 4, it should be apparent that by selectively intercoupling each of the terminals 14 and 12a and 13a with any of terminals 27, 28 and 29, the output of cell 11 as well as either of its input signals may be directed to adjacent cells. For example, by connecting terminals 14 and 12a to terminals 29 and 27, respectively, the output of cell 11 is directed to the adjacent cell on the same row while the input signal to cell 11 provided from an upper cell is also supplied via line 30 to a lower cell in the same column. Various different combinations of connections are diagrammed in FIGURES 5(a) through 5(j). In each figure, one or more non-intersecting lines are shown connecting various terminals of the panel 25 with the resulting signal flow. In each figure, the circle represents the cell 11. The arrow indicates the direction of flow of the output signal of the cell. Lines terminating in the circle indicate that the input signal is only supplied to the cell while a line extending across a cell indicates that the input signal is also directed to another cell.

As seen in FIGURES 5(a) through 5(g), the output signal is either supplied to a righthand cell or to a lower cell, while in FIGURES 5(h), 5(i) and 5(j), the output signal of the cell is not used at all, rather the patch panels associated with cells are used for signal routing. For example, in FIGURE 5(h), by connecting terminals 12a and 13a to terminals 27 and 29, respectively, the signal supplied to a cell to terminal 13 from a cell to the left is directly directed to a righthand cell while the signal supplied to terminal 12 from an upper cell is routed to a lower cell.

From FIGURES 5(a) through 5(j), it is seen that the various interconnections in each panel are accomplished without having the interconnecting lines cross one another. This characteristic is particularly significant for planar microelectronic construction techniques. Since the cell omprises four NOR gates and three switches, all of which can be constructed with known techniques on a single plane, the entire cell and patch panel combination is constructable on one plane except for the point of crossover of lines 30 and 32 (FIGURE 4).

For a better understanding of the significance of the novel panel arrangement with which each cell can be connected to adjacent cells, reference is made to FIGURE 6 which is a simplified diagram of an array 40 comprising four cells 11A through 11D and four panels 25A through 25D, each panel being associated with another cell. It should be recalled that each cell comprises four NOR gates and three switches as shown in FIGURE 1 so that by controlling the switches, the signal at the output terminal is a selected function of the signals supplied to input terminals 12 and 13. Let us assume that input signals $y_1$ and $x_1$ are supplied to terminals 12 and 13 of cell 11A and that signals $y_2$ and $x_2$ are supplied to terminal 12 of cell 11B and to terminal 13 of cell 11C. Let it further be assumed that lines 41 through 48 are used to interconnect the various terminals of panels 25A through 25D as shown in FIGURE 6. Then, from the foregoing, it should be appreciated that the output signal of cell 11A at its terminal 14 is a function of signals $x_1$ and $y_1$ as well as the switch positions inside cell 11A. Also since the output signal of cell 11A is supplied by means of line 42 as one input signal of cell 11C, the latter's output signal is a function of the output signal of cell 11A and signal $x_2$ as well as the positions of its internal switches.

As seen from FIGURE 6, cell 11B is not utilized but rather panel 25B associated therewith is used to route signals to adjacent cells. Thus line 43 routes the input signal $y_2$ at terminal 12a to an adjacent cell on the same row while line 44 routes the signal $y_1$, supplied to terminal 13a of panel 25B from panel 25A, to the input terminal 12 of lower cell 11D in the same column. The other input signal to cell 11D is $x_2$ supplied therethrough by means of line 46 in panel 25C. Thus the output signal of cell 11D which is a function of $y_1$ and $x_2$ is supplied by means of line 48 to an adjacent cell.

From the foregoing description, it should be appreciated that array 40, even though comprised of similar cell and patch panels, may produce any one of a large number of output signals as a function of the input signals supplied thereto. This is accomplished due to the ability of each cell to produce any one of a number of functions of its two input signals and the flexibility with which the various cells are interconnected by means of the patch panels associated therewith. In the array 40 of FIGURE 6, the outputs of each panel are directed to a cell on the right on the same row and to a lower cell in the same column. Also the input signals from the upper cell and an adjacent cell to the left are directly connected and supplied to each cell. For example, the input signals to cell 11B are those supplied from an upper cell and cell 11A while the panel 25B associated with cell 11B is connected to lower cell 11D and another cell (not shown) to the right of cell 11B.

The flexibility of the array can be increased greatly by constructing the array with a cell-patch-panel combination such as the one shown in FIGURE 7 to which reference is made herein. The cell-patch-panel combination comprises a cell 11E having two input terminals 12 and 13 and an output terminal 14 which in the present embodiment forms a part of a patch panel 25E. The panel 25E also includes a pair of terminals 51 and 52 connected to an input terminal 53 to which is supplied the signal from an adjacent cell to the left. The panel 25E also includes a pair of terminals 55 and 56 which are connected by means of a line 57 to an input terminal 58 to which the signal from an upper cell is supplied. Terminals 55 and 56 are disposed opposite terminals 51 and 52 respectively. Another terminal 61 disposed opposite centrally located output terminal 14 is connected via a line 62 to an output terminal 63 to which a lower cell is connected. Lines 62 and 57 cross at a point 64. The panel 25E further includes terminals 65 and 66 disposed on either side of terminal 61 and opposite terminals 12 and 13 respectively. Terminals 65 and 66 are connected by means of a line 67 to a terminal 68 which is connected to a cell on the right. Line 67 crosses lines 57 and 62 at points 71 and 72 respectively. Thus the patch panel 25E includes ten terminals and three points of line crossover.

Since as seen from FIGURE 7 either of the cell input terminals 12 and 13 may be connected to terminals provided with signals from an upper cell such as terminals 55 and 56 or to terminals provided with signals from an adjacent cell such as terminals 51 and 52, the cell can provide a greater number of functions of the two input signals. Also by using a patch panel arrangement as shown in FIGURE 7, the signal routing flexibility of the panel is greatly increased.

Reference is now made to FIGURES 8(a) through 8(q) which represent different interconnecting arrangements of a patch panel such as panel 25E shown in FIGURE 7. In the various figures as in FIGURES 5(a) through 5(j), the circle represents the cell, the arrow indicates the direction of the cell output, lines terminating at the cell indicate the direction from which cell input signals are received. Also, lines interconnected within each circle indicate the direction of routing of signals through the patch panel. In each of FIGURES 8(a) through 8(m) in the accompanying chart $P_1$ and $P_2$ indicate two different interconnecting arrangements for obtaining the same result. It should be pointed out that in all the arrangements diagrammed in FIGURES 8(a) through 8(q), none of the lines used to interconnect the various terminals cross one another. Thus, by using the novel patch panel shown in FIGURE 7, only three line crossovers are present, thereby greatly simplifying the construction of the panel when employing integrated circuit techniques.

From FIGURES 4 through 8, it should be appreciated that wheather the panel diagrammed in FIGURE 4 is used or the one shown in FIGURE 7, when the output of the associated cell is utilized, it is supplied either to the cell on the right on the same row or to a lower cell on the same column. This becomes apparent from FIGURES 5 and 8 in which the arrows point either to the right or in a downward direction. Such a characteristic need be considered in relation to the simplicity of construction of either of the panels shown in FIGURES 5 and 8.

Since however situations may arise in which it is desirable to direct the output of a cell to any one of its four adjacent cells, attention is directed to two other embodiments of patch panels diagrammed in FIGURES 9 and 10, and designated as panels 25F and 25G respectively. Panel 25F is shown comprising nine terminals, three of which are designated by numerals 12 and 13 to indicate the two input terminals of a cell 11F and numeral 14 to designate the output of the cell. The other six terminals are designated by numerals 91 through 96. As in FIGURE 7, numerals 53, 58, 63 and 68 designate terminals which connect to panel 25F to panels to the left, above, below and to the right of panel 25F respectively.

Terminal 53 is connected directly to terminal 91 which is on the same side of panel 25F as terminals 12, 13 and 14, and via line 101 to terminal 92 which is disposed opposite terminal 13. Line 102 is used to connect terminal 58 to terminals 93 and 94, the former being disposed above terminal 92 and the latter being disposed opposite terminal 94 and below terminal 92. Thus lines 101 and 102 cross over one another at a point 106. Similarly, line 104 connects terminal 68 to terminal 96 which is opposite terminal 91, while a line 103 crossing line 104 at point 107 interconnects terminal 63 to terminal 95 which is opposite terminal 12 and between terminals 94 and 96.

It is seen from FIGURE 9 that panel 25F includes only two points 106 and 107, at which lines connecting the various terminals used to couple the panel 25F to other panels cross over. The terminals 12, 13 and 14 are directly connected to the cell without any lines crossing over one another. On the other hand as seen from FIGURE 10, in panel 25G the line crossovers are all associated with lines connecting cell 11G to the panel 25G. Lines 111, 112, and 113 are used to connect terminals $12p$, $12q$ and $12r$ to one input terminal of cell 11G such as input terminal 12 of cell 11 shown in FIGURE 1. Similarly, lines 114 and 115 are used to connect the other input terminal of cell 11G, such as terminal 13 of cell 11 shown in FIGURE 1, to terminals $13p$ through $13s$. Lines 113 and 115 cross at a point 118. Also the output of cell 11G is connected via lines 116 and 117 to terminals $14p$ and $14q$, respectively. Line 116 crosses line 115 at a point 119 and line 117 crosses lines 113 and 115 at points 120 and 121, respectively.

In the panel 25G terminals $12p$, $13p$, $14p$, $13q$, $12q$, $13r$, $14q$, $13s$ and $12r$ are arranged along one straight line. Opposite such a line are disposed terminals 122 through 125 which are respectively connected via nonintersecting lines 126 through 129 to terminals 68, 58, 53 and 63 respectively. As herebefore described, terminals 68, 58, 53 and 63 connect panel 25G to adjacent panels to the right, above, to left and below it respectively.

By comparing panels 25F and 25G, it is seen that panel 25F comprises only nine terminals and two points of line crossover, while panel 25G includes twelve terminals and four points of line crossover, thus being more complex. However the added complexity may be justified since by using panel 25G the flexibility with which cell 11G may be connected to adjacent cells is greatly increased over that realizable with panel 25F. For example panel 25G may be interconnected with nonintersecting connecting lines so that cell 11G is supplied with the input signals from adjacent cells on the same row and the outputs supplied to both cells above and below it in the same column. This is accomplishable by connecting terminal 122 to terminal $12p$ or to terminal $13p$ and connecting terminal 124 to either terminal $13r$ or $12q$ to energize the cell 11G with the two input signals. Then by connecting terminal 125 to terminal $14q$ and terminal 123 to terminal $14p$ the ouput of cell 11G is supplied to the upper and lower cells. Such capability is not feasible with the panel embodiment shown in FIGURE 9.

FIGURE 11 to which reference is made herein represents forty different interconnecting arrangements, designated $a$ through $z$ and $aa$ through $ak$ which can be realized with panel 25G of FIGURE 10, without any of the lines used to connect any of the terminals crossing one another. Thus the only points of crossover are the four points 118 through 121 shown in FIGURE 10. As in FIGURES 5 and 8, in FIGURE 11 the circles represent cell 11G, the arrows indicate the direction or directions of the functional output signal of the cell and the nonarrowed lines indicate the directions of the input signals to the cell as well as directions of signal routing through the panel 25G.

Herebefore in FIGURES 4 through 11, the cells have been diagrammed as three terminal elements, two of which are used to provide the cell with input signals and the third be utilized as the cell output terminal to which a signal is provided by the cell which is a selected function of the input signals. Thus the various embodiments of the patch panels may be employed with any three terminal cells. When using any of the patch panels with the cell diagrammed in FIGURE 1, it is assumed that switches 21, 22 and 23 are selectively operable within the cell. However, if desired, terminals 21a and 21b (see FIGURE 1) which form a part of switch 21 and terminals 22a and 23a of switches 22 and 23, respectively, may be extended to form an extension of one of the patch panels so that all the selected interconnections may be made therein.

As seen from FIGURE 1, except for the line interconnecting NOR gates 17 and 18, all of the interconnecting lines are fixed. The connection between gates 17 and 18 is a function of the position of switch 21, which, when open, cuts the connection between the two gates. Thus, the logic portion of cell 11 may be thought of as a single cutpoint cell. Since the gates can be conveniently constructed with known microelectronic techniques, the reduced number of cutpoints is highly advantageous since it greatly simplifies the construction problems.

In another embodiment of the novel cell of the present invention diagrammed in FIGURE 12, the number of cutpoints, internal to the logic portion, is decreased to zero. As seen, cell 11H comprises a logic portion 130 which includes four NOR gates 15a through 18a which are connected like gates 15 through 18 of cell 11 in FIGURE 1, except that gates 15a, 16a and 17a have three inputs. Also the connection between gate 17a and 18a is fixed rather than being a function of the position of a switch such as switch 21. The outputs of gates 16a and 18a are assumed to represent output #1 and output #2 respectively of cell 11H.

The additional inputs of gates 15a and 17a are connected through terminals 131 and 132 to a source of binary signals 134 which provides the gates with signals which are selectively chosen to be either a binary "0" or a binary "1," thereby controlling the operation of the gates. Thus when the signal supplied from source 134 to either gate is a binary "1," its output is a binary "0" irrespective of its other inputs. However when a binary "0" is supplied, the output of each gate is a function of its other inputs.

The third input of gate 16a is connected through a terminal 133 to either a source 135 of a binary "0" signal or to the output of gate 18a. In addition, the cell includes a patch panel 135 which includes terminals 12 and 13 comprising the input terminals of the logic portion 130 and a terminal 141 which provides the cell with a signal from an adjacent cell, the signal being represented by x. The panel also includes a pair of terminals 142a and 142b to which are supplied the two outputs of an upper cell such as cell 11H. For explanatory purposes, it is assumed that the signals at terminals 142a and 142b are y and z respectively. It is appreciated however that since the logic portion 130 has only two input terminals 12 and 13, only two of the three input signals (x, y and z) may be operated upon at any given time. Hereafter, the novel characteristics of cell 11H will be described in conjunction with functions of input signals x and y.

The novel characteristics of cell 11H and the various functions produced therein as a function of either or both input signals x and y may best be explained in conjunction with chart-like FIGURE 13. Therein the check mark (√) in the first two columns indicates which of input signals x and y is operated upon, while the third column indicates the connections between the various terminals in panel 13G. Columns 4, 5 and 6 indicate the binary signal at terminals 131, 132 and 133, respectively, while the last two columns represent the two output signals as a function of x and/or y. As seen from the chart, the cell 11H may produce any one of twelve independent functions of the two input signals.

It can further be shown that the cell may also be operated as a flip-flop. This may be accomplished by connecting terminals 142a to terminal 13 and terminal 12 to terminal 141 and supplying a binary "0" signal to terminal 132 and binary "1" signals to terminals 131 and 133. Then using output #2 as the flip-flop output, the bistable circuit can be set with an x input signal and reset with the complement of the y input signal. By connecting terminal 142a to terminal 12 and terminal 13 to terminal 141, the y signal can be used to set the flip-flop and the complement of the x signal used for resetting. Thus cell 11H may selectively provide any one of twelve functions as well as be operated as a flip-flop which is extensively used in conjunction with logic circuitry.

From the foregoing, it should be appreciated that terminals 131, 132 and 133 as well as the two outputs may be extended to be included in panel 136, so that all the connections to and from logic portion 130 may be performed therethrough. Thus cell 11H may be thought of as comprising a logic portion free of internal cutpoints and a patch panel which is selectively interconnected to control the operation of the logic portion and the flow of signals therethrough. It should further be apparent that a plurality of cells like cell 11H may be interconnected to form an array, the outputs of which may be made to be complex functions of the functions provided by each cell.

There has accordingly been shown and described herein novel embodiments of logic cells, each including a logic portion which comprises of not more than four NOR gates. In one embodiment, each of the four gates has two inputs with the output of one gate being connected to one input of another gate through a cutpoint. In another embodiment, the logic portion is free of cutpoints. However, the number of inputs to three of the gates is increased to three. In addition, different embodiments of patch panels which may be connected to the logic portions of cells have been described. By means of selectively interconnecting patch panels associated with cells arranged in an array, different functions of input signals may be derived. The various patch panels are designed so that the number of line crossovers is minimized to be able to conveniently construct the entire array of patch panels and logic portions of the cell with known integrated circuit techniques.

It is appreciated that those familiar with the art may make modifications in the arrangements as shown without departing from the true spirit of the invention. Therefore, all such modifications and equivalents are deemed to fall within the scope of the invention as claimed in the appended claims.

What is claimed is:
 1. A logic cell comprising:
  four NOR gates, each having two input terminals and performing an identical function; and
  coupling means for selectively interconnecting said gates to form a logic cell having two input terminals and at least one output terminal, with the output signal at said output terminal being a function of the input signals at said two input terminals and the interconnections between the gates, said coupling means including first altering means for selectively coupling the output of one of said gates to one of the two inputs of another of said gates to control the functional output of said logic cell.
 2. The logic cell defined in claim 1 further including second altering means for selectively connecting the output of either of two gates to said output terminal to control the functional output of said logic stage to be in one of a plurality of states as a function of *a* and *b* binary input signals supplied to said two input terminals and the position of said first altering means, said states being those which produce at least:
an "and" function wherein one of the input terms *a* and *b* is complemented;
an "or" function wherein one of the input terms *a* and *b* is complemented; and
an "exclusive or" function wherein one of the input terms *a* and *b* is complemented.

3. A logic cell comprising:
first, second third and fourth identical logic gates, each having two input ports and an output port;
first and second input terminals;
means for connecting said first input terminal to one input port of each of said first and second gates;
means for connecting said second input terminal to the other input port of said first gate and to one input port of said third gate;
means for connecting the output port of said first gate to the other input ports of said second and third gates;
means for connecting the output port of said second gate to one input port of said fourth gate; and
means for selectively controlling the connection between the output port of said third gate to the other input of said fourth gate to control the output of said fourth gate as a function of the input signals supplied to said first and second input terminals, whereby the output signal of said fourth gate is an "or" function of the signals supplied to said first input terminal and the complement of the signal supplied to said second input terminal when the third and fourth gates are not interconnected, and the output signal of said fourth gate is an "exclusive-or" function of the signal supplied to said first input terminal and the complement of the signal supplied to said second input terminal when the output of said third gate is connected to one of the input ports of said fourth gate.

4. The logic cell defined in claim 3 wherein said four gates are NOR gates and the cell includes a single output terminal and means for selectively connecting the output of either said second gate or said fourth gate to said output terminal.

5. A logic cell comprising:
first, second and third identical logic gates, each having three input ports and an output port;
first and second input terminals;
signal source means for providing a plurality of gate enabling and disabling binary signals representing binary "1's" or binary "0's";
means for connecting said first input terminal to one input port of each of said first and second gates;
means for connecting said second input terminal to another input port of said first gate and to one input port of said third gate;
means for connecting the output port of said first gate to another input port of each of said second and third gates;
a fourth gate, performing the same function as each of said first, second and third gates, having two input ports and an output port;
means for connecting the output ports of said second and third gates to the two input ports of said fourth gate; and
means for fixedly connecting the third port of each of said first and third gates and for selectively connecting the third port of said second gate to said signal source means, whereby the signals at the output port of said fourth gate are functions of the signals supplied to said first and second input terminals and the binary signals supplied to said first, second and third gates by said signal source means, including means for connecting the output port of said fourth gate to the third input port of said second gate whereby said gates operate as a flip-flop when the signals from said signal source means to said first and third gates represent a binary "1" and a binary "0" respectively the output signal of said fourth gate representing the flip-flop output, said flip-flop being set by a signal representing a binary "1" supplied to said input terminal and reset by a signal representing a binary "0" supplied to said second input terminal.

6. A logic cell comprising:
first, second and third identical logic gates, each having three input ports and an output port;
first and second input terminals;
signal source means for providing a pluarlity of gate enabling and disabling binary signals representing binary "1's" or binary "0's";
means for connecting said first input terminal to one input port of each of said first and second gates;
means for connecting said second input terminal to another input port of said first gate and to one input port of said third gate;
means for connecting the output port of said first gate to another input port of each of said second and third gates;
a fourth gate, performing the same function as each of said first, second and third gates, having two input ports and an output port;
means for connecting the output ports of said second and third gates to the two input ports of said fourth gates; and
means for fixedly connecting the third port of each of said first and third gates and for selectively connecting the third port of said second gate to said signal source means, whereby the signals at the output port of said fourth gate are functions of the signals supplied to said first and second input terminals and the binary signals supplied to said first, second and third gates by said signal source means.

7. The logic cell defined in claim 6 wherein said gates are NOR gates and the signals at the output ports of said second and fourth gates are the complement of and the same as the binary signal respectively supplied so the first input terminal when the signals at the second input terminal and the third port of said second gate represent binary "0" and the signals supplied by said signal source means to said first and second gates represent binary "1's," the signal at the output port of said second gate representing the "and" function of the signal supplied to said first input terminal and the complement of the signal supplied to said second input terminal, and the signal at the output port of said fourth gate representing the "or" function of the complement of the signal supplied to said first input terminal and the signal supplied to said second input terminal when said first and second gates are provided with signals representing binary "0's" from said signal source means and said third gate is provided with a signal representing a binary "1."

8. The logic cell defined in claim 6 wherein said gates are NOR gates and the signal at the output port of said fourth gate represents the "exclusive or" function of the signal supplied to said first input terminal and the complement of the signal supplied to said second input terminal when all the signals supplied to said first, second and third gates from said signal source means represent binary "0's," the signal at the output port of said fourth gate representing the "and" function of signals supplied to said first and second input terminals when the signals supplied to said first gate from said signal source means represents a binary "1" and the signals supplied to said second and third gates represent binary "0,s."

9. In a logic array comprising a plurality of logic stages arranged in a matrix of rows and columns wherein each stage is adapted to provide an output signal which is a selected function of as many as two input signals supplied to two input ports from adjacent stages the improvement comprising:

panel means associated with each logic state comprising a plurality of terminals arranged in two parallel lines in a common plane; and interconnecting means for interconnecting selected ones of said terminals to control the routing of the output signals of its associated stages and for routing the signals supplied thereto from panel means associated with adjacent stages to panel means associated with other adjacent stages.

10. In combination, a logic cell comprising a plurality of interconnected logic elements having two input ports and at least one output port for providing at least one output signal which is a selected function of not more than two input signals;

panel means comprising a plurality of terminals arranged in two lines in a common single plane;

means for connecting two of said terminals to the input ports of said logic elements;

means for connecting another of said terminals to the output port of said logic elements;

means for supplying input signals to at least two other terminals; and interconnecting means for interconnecting different terminals for controlling the supply of the input signals to said input ports and the supply of the output signals of said elements to other terminals of said panel means and for controlling the supply of the input signals to said other terminals to control the function produced by said logic elements and the routing of the output signal thereof and the input signals supplied to said panel means.

References Cited

UNITED STATES PATENTS 3,241,118   3/1966   Domenico et al. _____ 307—211 X

OTHER REFERENCES

Hellerman: "A Catalog of Three-Variable OR-Invert and AND-Invert Logical Circuits," I.E.E.E. Transactions on Electronic Computers, June 1963 (pp. 198 to 223), (pp. 198, 205 and 220 relied on).

DONALD D. FORRER, *Primary Examiner.*

U.S. Cl. X.R.

307—203, 207, 216, 218; 328—92